(12) United States Patent
Zhang

(10) Patent No.: US 11,637,800 B2
(45) Date of Patent: Apr. 25, 2023

(54) METHOD AND DEVICE FOR INFORMATION PROCESSING OF CROSS-DEVICES, AND STORAGE MEDIUM

(71) Applicant: BEIJING XIAOMI MOBILE SOFTWARE CO., LTD., Beijing (CN)

(72) Inventor: Panpan Zhang, Beijing (CN)

(73) Assignee: Beijing Xiaomi Mobile Software Co., Ltd., Beijing (CN)

( * ) Notice: Subject to any disclaimer, the term of this patent is extended or adjusted under 35 U.S.C. 154(b) by 0 days.

(21) Appl. No.: 17/334,989

(22) Filed: May 31, 2021

(65) Prior Publication Data
US 2022/0210110 A1 Jun. 30, 2022

(30) Foreign Application Priority Data
Dec. 28, 2020 (CN) .......................... 202011577611.4

(51) Int. Cl.
*G06F 15/16* (2006.01)
*H04L 51/224* (2022.01)

(52) U.S. Cl.
CPC .................. *H04L 51/224* (2022.05)

(58) Field of Classification Search
CPC ..... H04L 51/24; H04L 67/1095; H04L 67/10; H04L 29/0854; H04L 51/224; H04L 63/08; H04L 67/34; H04L 67/535
USPC ......................... 709/204, 230, 248
See application file for complete search history.

(56) References Cited

U.S. PATENT DOCUMENTS

| 6,704,770 B1 | 3/2004 | Ramakesavan | |
|---|---|---|---|
| 8,964,947 B1 | 2/2015 | Noolu et al. | |
| 2004/0210846 A1 | 10/2004 | Olsen | |
| 2013/0014006 A1* | 1/2013 | Abellera | G06F 3/0482 715/234 |
| 2013/0238744 A1* | 9/2013 | Paschke | G06F 9/543 709/216 |
| 2014/0095673 A1* | 4/2014 | Mao | H04W 4/203 709/219 |
| 2014/0136481 A1* | 5/2014 | Quan | H04W 4/023 707/617 |

(Continued)

FOREIGN PATENT DOCUMENTS

EP   1269392 A2   1/2003

OTHER PUBLICATIONS

Ikematsu Kaori G0920502@gmail com et al: "Memory stones an intuitive copy-and-paste method between multi-touch computers", Human Factors in Computing Systems, ACM, 2 Penn Plaza, Suite 701 New York NY 10121-0701 USA, Apr. 27, 2013 (Apr. 27, 2013), pp. 1287-1292, XP058601290, DOI: 10.1145/2468356.2468586, ISBN: 978-1-4503-1899-0, the whole document, (xp).

(Continued)

*Primary Examiner* — Kaylee J Huang
(74) *Attorney, Agent, or Firm* — Arch & Lake LLP

(57) ABSTRACT

A method for information processing, device for information processing and storage medium are disclosed. The method includes: connecting with a second terminal, and acquiring a notification message sent by the second terminal, wherein the notification message is generated by the second terminal after a first operation is detected by the second terminal; and outputting a responding result for the first operation according to the notification message.

19 Claims, 7 Drawing Sheets

(56) References Cited

U.S. PATENT DOCUMENTS

| | | | | |
|---|---|---|---|---|
| 2014/0351434 A1* | 11/2014 | Kim | ................. | H04M 1/72415 |
| | | | | 709/225 |
| 2015/0012861 A1 | 1/2015 | Loginov | | |
| 2015/0169203 A1 | 6/2015 | Noolu et al. | | |
| 2016/0029153 A1* | 1/2016 | Linn | ...................... | H04L 67/10 |
| | | | | 455/41.1 |
| 2016/0062540 A1* | 3/2016 | Yang | ................. | G06F 3/04883 |
| | | | | 345/173 |
| 2017/0034264 A1* | 2/2017 | Yang | ...................... | H04W 4/80 |
| 2020/0117331 A1* | 4/2020 | Ye | ........................ | G06F 3/0488 |

OTHER PUBLICATIONS

European Search Report in the European Application No. 21176700.9, dated Nov. 19, 2021, (10p).

* cited by examiner

METHOD AND DEVICE FOR INFORMATION PROCESSING OF CROSS-DEVICES, AND STORAGE MEDIUM

CROSS-REFERENCE TO RELATED APPLICATION

This Application is based upon and claims the priority to Chinese Patent Application No. 202011577611.4, filed on Dec. 28, 2020, the contents of which are incorporated herein by reference in their entirety for all purposes.

BACKGROUND

Information design, also known as communication design, is a fast-developing subject related to multiple fields, such as font design, planar design, applied linguistics, applied psychology, applied ergonomics and computer science. The information design responds to the needs of people to understand and use various types of affairs, such as forms, legal documents, identifiers, computer interfaces, technical information and operation/assembly guides.

With the development of cross-device connections, the information relay between mobile phones and computers has also received extensive attention in the industry.

SUMMARY

The disclosure relates to the technical field of information processing, and particularly, to a method and device for information processing.

According to a first aspect of an example of the disclosure, a method for information processing applied to a first terminal is provided, including: a second terminal is connected, and a notification message sent by the second terminal is acquired, wherein the notification message is generated by the second terminal after a first operation is detected by the second terminal; and a responding result for the first operation is output by the first terminal according to the notification message.

According to a second aspect of an example of the disclosure, a method for information processing applied to a second terminal is provided, including: a notification message is generated based on a detected first operation; and the notification message is sent to a first terminal so that the first terminal outputs a responding result for the first operation according to the notification message.

According to a third aspect of an example of the disclosure, a device for information processing applied to a first terminal is provided, including: a processor; and a memory configured to store instructions executable by the processor, wherein the processor is configured to execute the instructions to: connect the first terminal with a second terminal and acquire a notification message sent by the second terminal, wherein the notification message is generated by the second terminal after a first operation is detected by the second terminal; and output a responding result for the first operation according to the notification message.

It is to be understood that the above general descriptions and detailed descriptions below are only explanatory and not intended to limit the disclosure.

BRIEF DESCRIPTION OF THE DRAWINGS

The accompanying drawings, which are incorporated in and constitute a part of this specification, illustrate examples consistent with the disclosure and, together with the specification, serve to explain the principles of the disclosure.

DETAILED DESCRIPTION

Reference will now be made in detail to examples, examples of which are illustrated in the accompanying drawings. The following description refers to the accompanying drawings in which the same reference numbers in different drawings represent the same or similar elements unless otherwise indicated. The implementations set forth in the following description of examples do not represent all implementations consistent with the disclosure. Instead, they are merely examples of devices and methods consistent with aspects related to the disclosure.

Figure 1:
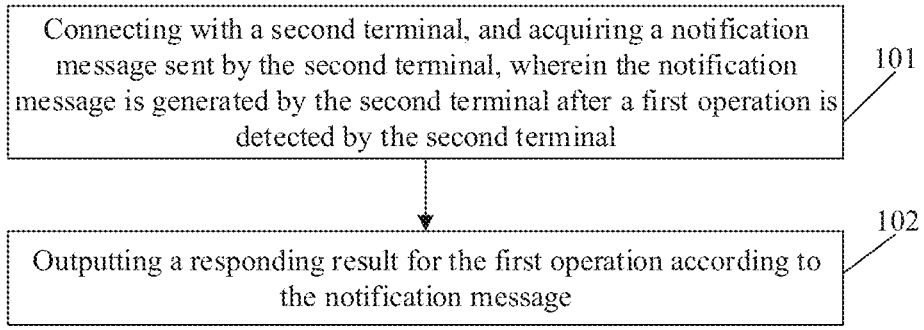
FIG. 1 is a first flow chart illustrating a method for information processing according to an example of the disclosure.

FIG. 1 is a first flow chart illustrating a method for information processing according to an example of the disclosure. As illustrated in FIG. 1, a method for information processing applied to a first terminal includes the following steps.

In step 101, a second terminal is connected, and a notification message sent by the second terminal is acquired, wherein the notification message is generated by the second terminal after a first operation is detected by the second terminal.

In step 102, a responding result for the first operation is output according to the notification message.

In some examples, the first terminal may be the same type of terminal device, or may be a different type of terminal device. For example, both the first terminal and the second terminal are mobile phones; or both the first terminal and the second terminal are Personal Computers (PC); or the first terminal is a mobile phone, and the second terminal is a PC; or the first terminal is a PC, and the second terminal is a mobile phone. In some other examples, the first terminal and the second terminal may also include: a tablet computer, a wearable device, etc., which are not specifically limited herein.

In the examples of the disclosure, a wired connection may be established between the first terminal and the second terminal, and the wired connection includes, but is not limited to, a Universal Serial Bus (USB) connection or a serial port connection. Furthermore, the first terminal and the second terminal may also be wirelessly connected. For example, a wireless connection is established by means of Bluetooth communication or Near Field Communication (NFC). The wireless connection further includes: a wireless connection established by means of a Device to Device (D2D) or Wireless Fidelity (Wi-Fi) direct connection.

In the examples of the disclosure, the first terminal may acquire the notification message sent by the second terminal based on the connection established with the second terminal, and after the notification message is acquired, the responding result for the first operation may be output based on the first terminal according to the notification message. Here, the notification message is generated after the second terminal detects the first operation, and may carry message content associated with the first operation. For example, the responding result for the first operation may be carried in the notification message, so that the response result generated in the second terminal may be sent to the first terminal through the notification message, and the response result may be output through the first terminal.

For example, if the first operation is an opening operation for a first video application in the second terminal, a notification message may be generated based on the opening operation, and the notification message is sent to the first terminal; after the first terminal receives the notification message, whether the first terminal has a second video application of the same type as the first video application may be determined based on the notification message; and under the condition that the first terminal has a second video application of the same type as the first video application, the second video application may be directly opened.

The opening operation may be a click operation on an icon of the first video application displayed on the current interface of the second terminal. Of course, the opening operation may also be a long-press operation, etc., which is not specifically limited here.

In the examples of the disclosure, after a connection between the first terminal and the second terminal is established, the first terminal may receive the notification message sent by the second terminal, and the responding result for the first operation may be output based on the first terminal according to the notification message. In this way, on the one hand, the relay of the first operation on the second terminal may be realized based on the first terminal, that is, the subsequent steps of the first operation performed on the second terminal may be executed on the first terminal, and under the condition that a user is inconvenient to use or does not want to continue to use the second terminal, the user may continue to use the first terminal for subsequent operations, thereby improving the experience of the user using a terminal device. On the other hand, in the disclosure, the relay of the first operation may be realized only by establishing a connection between the first terminal and the second terminal, and there is no need for the user to log in the unified account on the first terminal and the second terminal respectively and then perform data sharing and operation relay, so that the operation steps of the user may be reduced to improve the convenience of the operation.

In some examples, the responding result for the first operation is output based on the first terminal according to the notification message, including:

a first application, to which the first operation is applied, on the second terminal is determined according to the notification message;

it is determined that the first terminal has a second application associated with the first application; and the response result is output through the second application.

In the examples of the disclosure, after the first terminal acquires the notification message, the first application that the first operation acts on, located on the second terminal, may be determined based on the notification message, and under the condition that it is determined that the first terminal has a second application associated with the first application, the response result may be output based on the second application.

In some examples, the second application associated with the first application at least includes: an application of the same type as the first application, and an application that executes the same function as the first application. For example, if the first application is a camera, the second application may be an image player or a video player; if the first application is a notepad, the second application is also a notepad; if the first application is a Microsoft office Word tool, the second application is also a Microsoft office Word tool; and if the first application is a browser, the second application is also a browser.

In some examples, under the condition that the first operation acts on the first application located on the second terminal, the second terminal may generate a notification message based on the program parameters of the first application and send the notification message to the first terminal, and after the first terminal receives the notification message, the program parameters of the first application may be acquired from the notification message, wherein the program parameters may be the identification information of the first application.

Taking the program parameters as the identification information of the first application as an example, the identification information may be compared with the identification information of each application in the first terminal, whether the first terminal has a second application associated with the first application is determined according to the comparison result, and under the condition that the first terminal has the second application, the response result is output based on the second application.

Taking the first operation as a shooting operation for shooting controls on a camera interface of the second terminal as an example, after the second terminal detects the shooting operation for shooting controls, a camera is controlled to perform image collection, a notification message is generated at the same time, and after the first terminal receives the notification message, an image collected by the second terminal may be directly displayed through an image player.

In some other examples, the notification message may also be displayed on the current interface of the first terminal, and after a trigger operation for the notification message is detected, the image collected by the second terminal is displayed through the image player.

In some other examples, if there is no second application in the first terminal, prompting information may be output in the current interface of the first terminal to prompt a user to download and install the second application.

In the examples of the disclosure, under the condition that the first operation acts on the first application located on the second terminal, a notification message may be generated directly based on the first operation, and the notification message may be sent to the first terminal through the second terminal, thus, the first terminal may determine the second application associated with the first application directly based on the notification message, and output the response result based on the second application. In this way, the relay between applications may be realized. In other words, if the user is inconvenient to use or does not want to use the second terminal to use the first application, based on the connection between the first terminal and the second terminal, the user continues to execute subsequent operations of the first operation based on the second application associated with the first application in the first terminal, thereby improving the experience of the user using a terminal device.

In some examples, the method further includes:

the notification message is displayed at a set position on the current interface of the first terminal; and the responding result for the first operation is output based on the first terminal according to the notification message, including:

the response result is output based on a detected trigger operation for the set position.

Here, the set position may be determined according to needs as long as the set position is a position that is convenient for the user to operate. For example, the notification message may be displayed at the right edge of the current interface, such as at the lower right corner of the current interface.

In an implementation process, the trigger operation for the set position may be detected, and the response result may be output based on the trigger operation. Still taking the first operation as a shooting operation for shooting controls on the camera interface of the second terminal as an example, after the second terminal detects the shooting operation for shooting controls, the camera may be controlled to perform image collection, a notification message is generated at the same time, after the first terminal receives the notification message, the notification message may be displayed at the lower right corner of the current interface, and when a trigger operation for a display region of the lower right corner is detected, the image collected by the second terminal may be displayed through the image player.

In some examples, the notification message floats and is displayed at the set position in a form of a notification box. In some other examples, the notification message is not limited to be suspended and displayed in a form of a notification box, and may also be suspended and displayed in the form of linking.

In the examples of the disclosure, by displaying the notification message on the current interface of the first terminal, an interface for an input operation may be provided for the user to facilitate the operation of the user, thereby improving the experience of the user.

In some other examples, when the notification message is displayed in a form of a notification box, a prompting message about the first operation may be displayed in the notification box. For example, the prompting message may be displayed in the form of text, or the prompting message may be displayed in the form of a picture. For example, if the first operation is a shooting operation, the prompting message may be displayed in the form of a picture.

In some examples, the responding result for the first operation is output based on the first terminal according to the notification message, including:

the response result generated based on the first operation is acquired from the notification message; and the response result is output based on the first terminal.

In the examples of the disclosure, after the second terminal detects the first operation, the responding result for the first operation may be acquired, and the response result is carried in a notification message to be sent to the first terminal; and after the first terminal receives the notification message, the response result may be acquired from the notification message, and the response result is output.

In the examples of the disclosure, by generating the response result at the second terminal and carrying the response result in the notification message to be sent to the first terminal, the first terminal may output the response result without requiring the user to perform an additional uploading or downloading operation, thereby simplifying the user operation and further improving the user experience.

In some examples, the first operation includes a copying operation;

the response result generated based on the first operation is acquired from the notification message, including:

content information is acquired from the notification message, wherein the content information is content information selected based on the copying operation; and the response result is output based on the first terminal, including:

the selected content is output based on a pasting operation detected by the first terminal, wherein the selected content includes at least one of text content or picture content.

Figure 2:
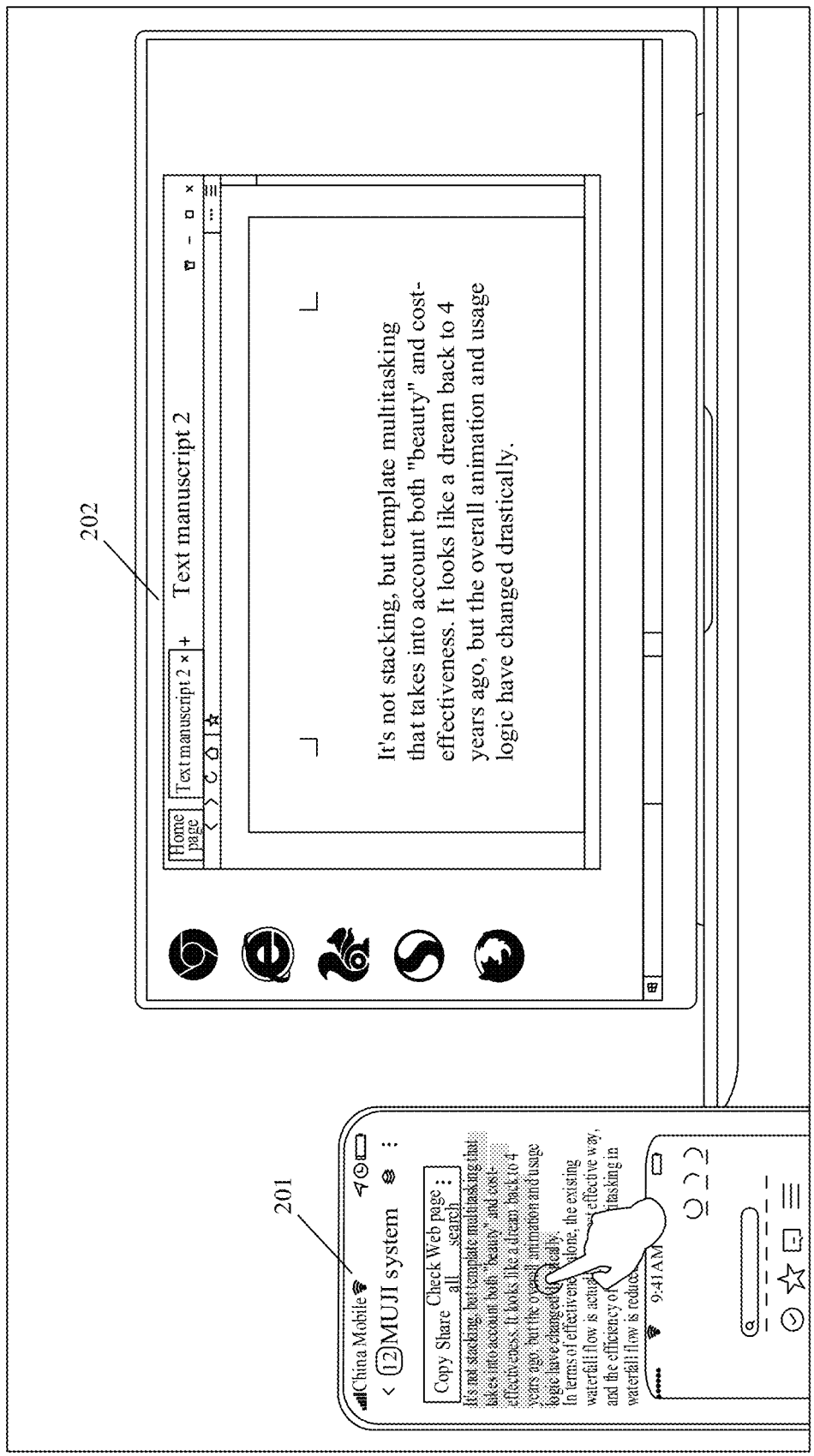
FIG. 2 is a first schematic diagram illustrating interaction between terminals according to an example of the disclosure.

FIG. 2 is a first schematic diagram illustrating interation between terminals according to an example of the disclosure. As illustrated in FIG. 2, a first terminal 202 may be a computer, and a second terminal 201 may be a mobile phone. In an implementation process, the selected content information may be determined from a notepad in the mobile phone based on the selected operation, a copying operation is performed on the content information, and a notification message generated based on the copying operation may be sent to the computer while the copying operation is performed. After the computer receives the notification message, the notepad in the computer may be opened, a pasting operation for the notepad is detected, and after the pasting operation for the notepad is detected, the content information copied from the mobile phone may be pasted to the notepad in the computer.

In some examples, the first operation includes a shooting operation;

the response result generated based on the first operation is acquired from the notification message, including:

an image shot based on the shooting operation is acquired from the notification message; and the response result is output based on the first terminal, including:

the image is output based on the first terminal.

Figure 3:
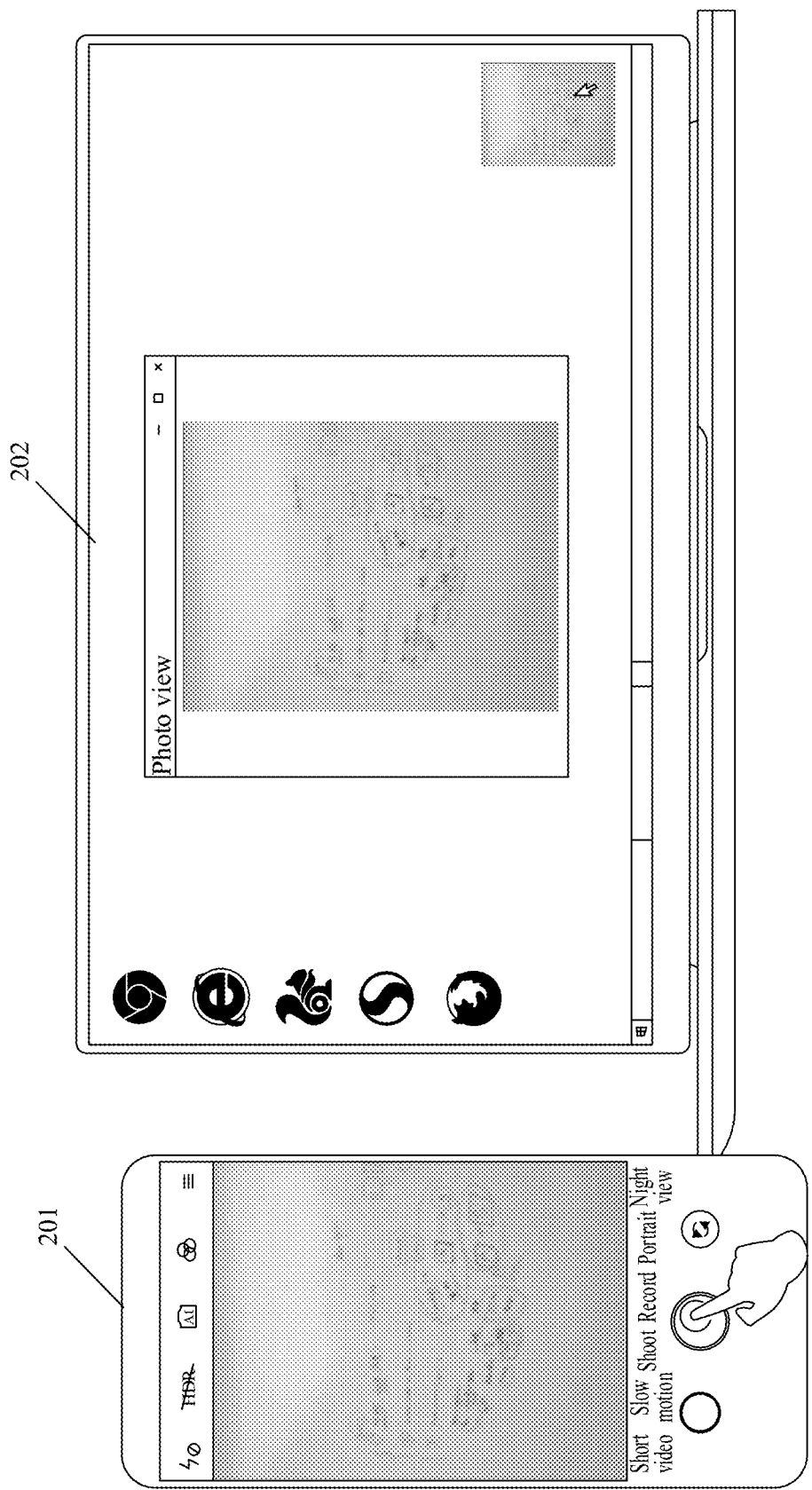
FIG. 3 is a second schematic diagram illustrating interaction between terminals according to an example of the disclosure.

FIG. 3 is a second schematic diagram illustrating interation between terminals according to an example of the disclosure. As illustrated in FIG. 3, a first terminal 202 may be a computer, and a second terminal 201 may be a mobile phone. In an implementation process, after the mobile phone detects a shooting operation for shooting controls, a camera on the mobile phone may be controlled to perform image collection, a notification message is generated at the same time and is sent to the computer, and after the computer receives the notification message, an image collected by the mobile phone may be directly displayed through an image player.

In some examples, the first operation includes a document browsing operation;

the response result generated based on the first operation is acquired from the notification message, including:

document content targeted by the document browsing operation is acquired from the notification message; and the response result is output based on the first terminal, including:

the document content is output based on the first terminal.

Figure 4:
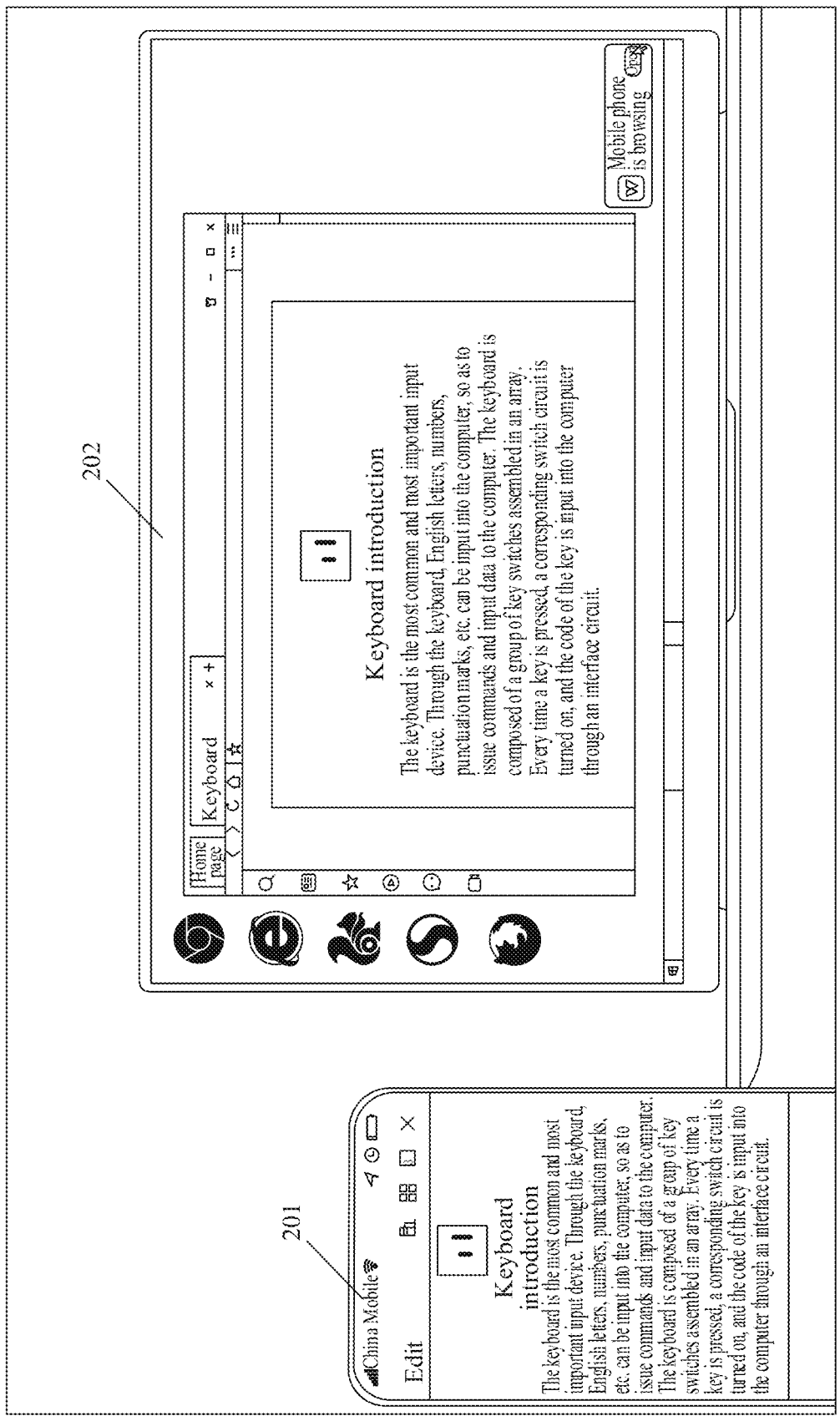
FIG. 4 is a third schematic diagram illustrating interaction between terminals according to an example of the disclosure.

FIG. 4 is a third schematic diagram illustrating interation between terminals according to an example of the disclosure. As illustrated in FIG. 4, a first terminal 202 may be a computer, and a second terminal 201 may be a mobile phone. In an implementation process, after the mobile phone detects the document browsing operation for the document content, a notification message may be generated and is sent to the computer, and after the computer receives the notification message, the document content may be output directly through a document application.

In some examples, the first operation includes a web page browsing operation;

the response result generated based on the first operation is acquired from the notification message, including:

web page content targeted by the web page browsing operation is acquired from the notification message; and the response result is output based on the first terminal, including:

the web page content is output based on the first terminal.

Figure 5:
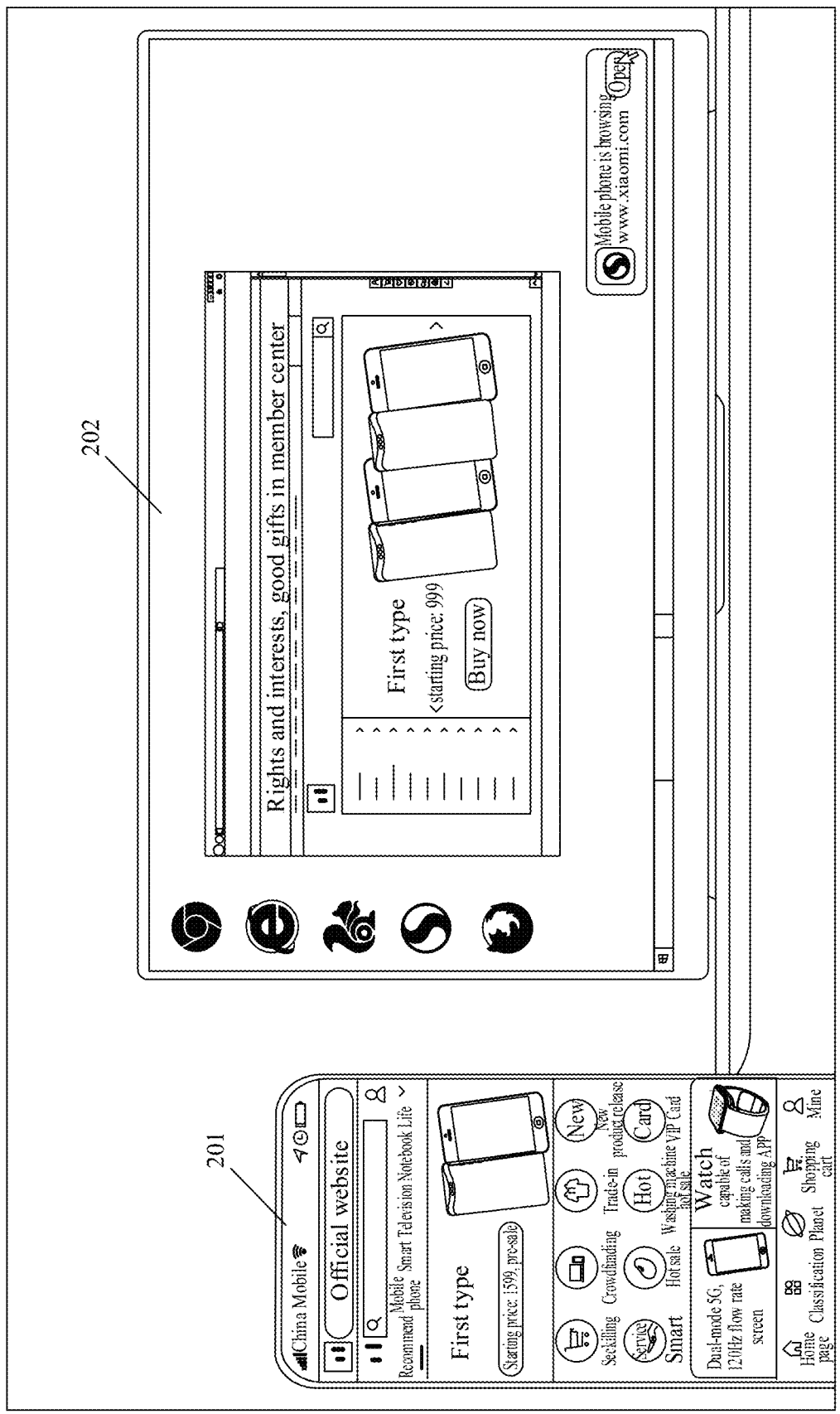
FIG. 5 is a fourth schematic diagram illustrating interaction between terminals according to an example of the disclosure.

FIG. 5 is a fourth schematic diagram illustrating interation between terminals according to an example of the disclosure. As illustrated in FIG. 5, a first terminal 202 may be a computer, and a second terminal 201 may be a mobile phone. In an implementation process, after the mobile phone detects the web page browsing operation for the web page content, a notification message may be generated and is sent to the computer, and after the computer receives the notification message, the web page content may be output directly through a browser.

Through the technical solution in the disclosure, the relay operation of the text content may be realized, and the relay operation of images, documents and web pages may be realized.

Figure 6:
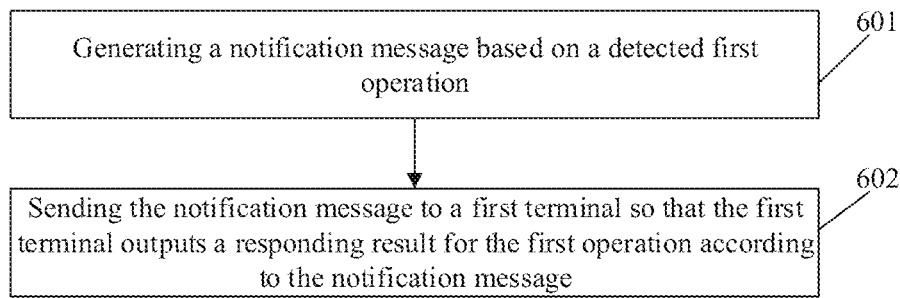
FIG. 6 is a second flow chart illustrating a method for information processing according to an example of the disclosure.

FIG. 6 is a second flow chart illustrating a method for information processing according to an example of the disclosure. As illustrated in FIG. 6, a method for information processing applied to a second terminal includes the following steps:

in step 601, a notification message is generated based on a detected first operation; and in step 602, the notification message is sent to a first terminal so that the first terminal outputs a responding result for the first operation according to the notification message.

In the examples of the disclosure, after the second terminal detects the first operation, the responding result for the first operation may be acquired, and the response result is carried in a notification message to be sent to the first terminal; and after the first terminal receives the notification message, the response result may be acquired from the notification message, and the response result is output.

In the examples of the disclosure, by generating the response result at the second terminal and carrying the response result in the notification message to be sent to the first terminal, the first terminal may output the response result without requiring the user to perform an additional uploading or downloading operation, thereby simplifying the user operation and further improving the user experience.

In some examples, the notification message is generated based on the detected first operation, including:

when the first operation is applied to the first application located on the second terminal, the notification message is generated based on program parameters of the first application, wherein the program parameters are used by the first terminal to determine that there is a second application associated with the first application.

In some examples, under the condition that the first operation acts on the first application located on the second terminal, the second terminal may generate a notification message based on the program parameters of the first application and send the notification message to the first terminal, and after the first terminal receives the notification message, the program parameters of the first application may be acquired from the notification message, wherein the program parameters may be the identification information of the first application.

Taking the program parameters as the identification information of the first application as an example, the identification information may be compared with the identification information of each application in the first terminal, whether the first terminal has a second application associated with the first application is determined according to the comparison result, and under the condition that the first terminal has the second application, the response result is output based on the second application.

Taking the first operation as a shooting operation for shooting controls on the camera interface of the second terminal as an example, after the second terminal detects the shooting operation for shooting controls, the camera may be controlled to perform image collection, a notification message is generated at the same time, and after the first terminal receives the notification message, an image collected by the second terminal may be directly displayed through an image player.

In some examples, the notification message may also be displayed on the current interface of the first terminal, and after a trigger operation for the notification message is detected, the image collected by the second terminal is displayed through the image player.

In some other examples, if there is no second application in the first terminal, prompting information may be output in the current interface of the first terminal to prompt a user to download and install the second application.

In the examples of the disclosure, under the condition that the first operation acts on the first application located on the second terminal, a notification message may be generated directly based on the first operation, and the notification message may be sent to the first terminal through the second terminal, thus, the first terminal may determine the second application associated with the first application directly based on the notification message, and output the response result based on the second application. In this way, the relay between applications may be realized. In other words, if the user is inconvenient to use or does not want to use the second terminal to use the first application, based on the connection between the first terminal and the second terminal, the user continues to execute subsequent operations of the first operation based on the second application associated with the first application in the first terminal, thereby improving the experience of the user using a terminal device.

In some examples, the notification message is generated based on the detected first operation, including:

the notification message is acquired based on the response result generated by the first operation.

In some examples, the first operation includes at least one of:

a copying operation;
a shooting operation;
a document browsing operation; or
a web page browsing operation.

Through the technical solution in the disclosure, the relay operation of the text content may be realized, and the relay operation of images, documents and web pages may be realized.

Figure 7:
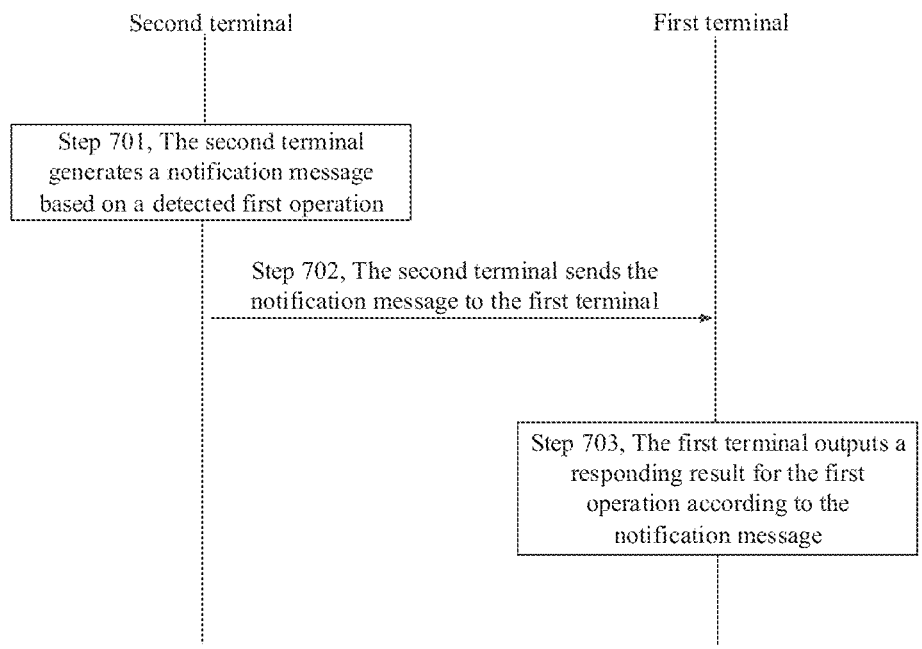
FIG. 7 is an interaction flow chart illustrating a method for information processing according to an example of the disclosure.

FIG. 7 is an interaction flow chart illustrating a method for information processing according to an example of the disclosure. As illustrated in FIG. 7, a method for information processing applied to a first terminal and a second terminal includes the following steps:

in step 701, the second terminal generates a notification message based on a detected first operation;

in step 702, the second terminal sends the notification message to the first terminal; and in step 703, the first terminal outputs the responding result for the first operation according to the notification message.

In the examples of the disclosure, after a connection between the first terminal and the second terminal is established, the first terminal may receive the notification message sent by the second terminal, and the responding result for the first operation may be output based on the first terminal according to the notification message. In this way, on the one hand, the relay of the first operation on the second terminal may be realized based on the first terminal, that is, the subsequent steps of the first operation performed on the second terminal may be executed on the first terminal, and under the condition that a user is inconvenient to use or does not want to continue to use the second terminal, the user may continue to use the first terminal for subsequent operations, thereby improving the experience of the user using a terminal device. On the other hand, in the disclosure, the relay of the first operation may be realized only by establishing a connection between the first terminal and the second terminal, and there is no need for the user to log in the unified account on the first terminal and the second terminal respectively and then perform data sharing and operation relay, so that the operation steps of the user may be reduced to improve the convenience of the operation.

Figure 8:
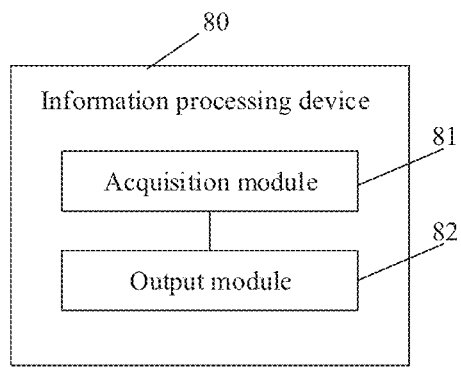
FIG. 8 is a first diagram illustrating a device for information processing according to an example.

FIG. 8 is a first diagram illustrating a device for information processing according to an example. Referring to FIG. 8, the device 80 for information processing applied to a first terminal includes:

an acquisition module 81 configured to connect with a second terminal and acquire a notification message sent by the second terminal, wherein the notification message is generated by the second terminal after a first operation is detected by the second terminal; and an output module 82 configured to output a responding result for the first operation according to the notification message.

In some examples, the output module 82 includes:

an acquisition sub-module configured to acquire the response result generated based on the first operation from the notification message; and an output sub-module configured to output the response result based on the first terminal.

In some examples, the first operation includes a copying operation;

the acquisition sub-module is further configured to:

acquire content information from the notification message, wherein the content information is content information selected based on the copying operation; and the output sub-module is further configured to:

output the selected content based on a pasting operation detected by the first terminal, wherein the selected content includes at least one of text content or picture content.

In some examples, the first operation includes a shooting operation;

the acquisition sub-module is further configured to:

acquire an image shot based on the shooting operation from the notification message; and the output sub-module is further configured to:

output the image based on the first terminal.

In some examples, the first operation includes a document browsing operation;

the acquisition sub-module is further configured to:

acquire document content targeted by the document browsing operation from the notification message; and the output sub-module is further configured to:

output the document content based on the first terminal.

In some examples, the first operation includes a web page browsing operation;

the acquisition sub-module is further configured to:

acquire web page content targeted by the web page browsing operation from the notification message; and the output sub-module is further configured to:

output the web page content based on the first terminal.

In some examples, the output module 82 is further configured to:

determine a first application, to which the first operation is applied, on the second terminal according to the notification message;

determine that the first terminal has a second application associated with the first application; and output the response result through the second application.

In some examples, the device 80 further includes:

a display module configured to display the notification message at a set position on the current interface of the first terminal; and the output module is further configured to:

output the response result based on a detected trigger operation for the set position.

In some examples, the notification message floats and is displayed at the set position in a form of a notification box.

Figure 9:
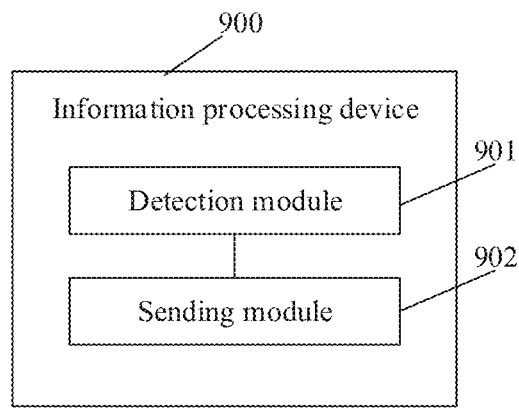
FIG. 9 is a second diagram illustrating a device for information processing according to an example.

FIG. 9 is a second diagram illustrating a device for information processing according to an example. Referring to FIG. 9, the device for information processing applied to a second terminal 900 includes:

a detection module 901 configured to generate a notification message based on the detected first operation; and a sending module 902 configured to send the notification message to a first terminal so that the first terminal outputs a responding result for the first operation according to the notification message.

In some examples, the detection module 901 is further configured to:

generate the notification message based on program parameters of the first application when the first operation is applied to the first application located on the second terminal, wherein the program parameters are used by the first terminal to determine that there is a second application associated with the first application.

In some examples, the detection module 901 is further configured to:

acquire the notification message based on the response result generated by the first operation.

In some examples, the first operation includes at least one of:

a copying operation;

a shooting operation;

a document browsing operation; or a web page browsing operation.

With respect to the device in the above example, the specific manners for performing operations for individual modules therein have been described in detail in the example regarding the method, which will not be elaborated herein.

Figure 10:
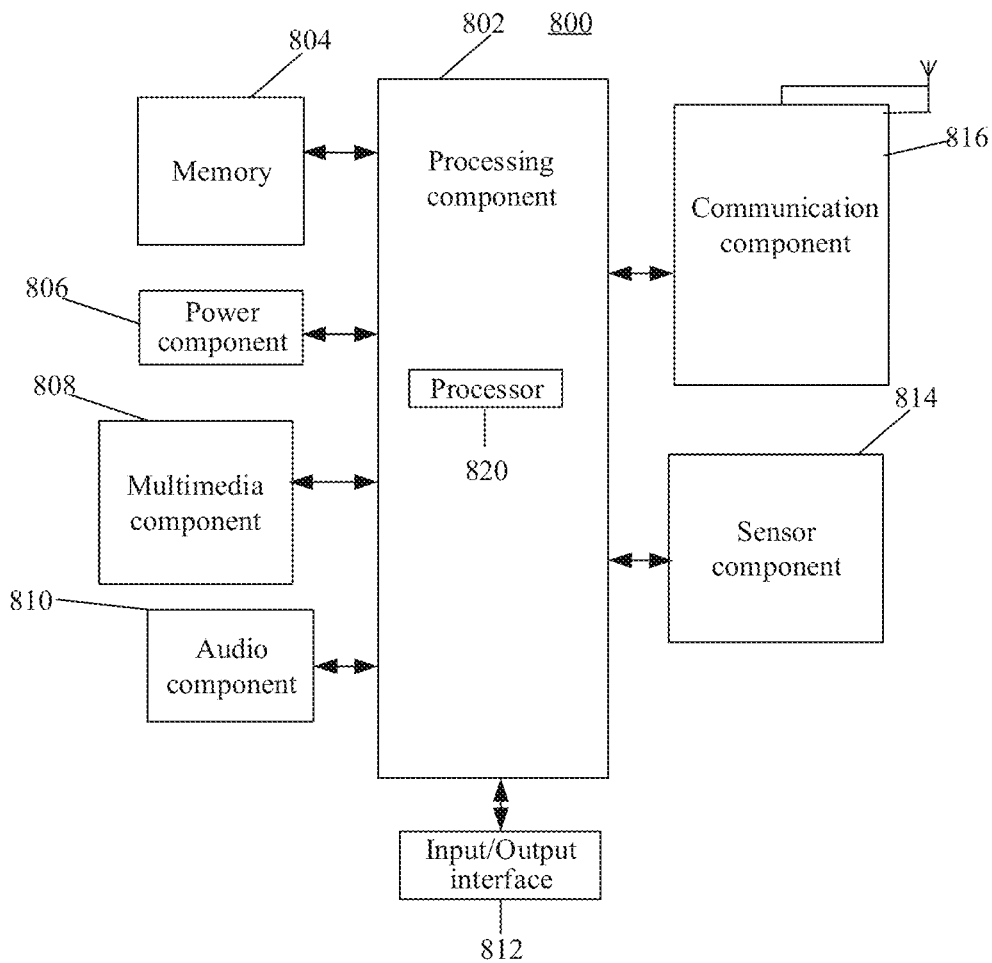
FIG. 10 is a block diagram illustrating a terminal device according to an example.

FIG. 10 is a block diagram illustrating a terminal device 800 according to an example. For example, the device 800 may be a first terminal or a second terminal. For example, the first terminal is a computer, and the second terminal is a mobile phone.

Referring to FIG. 10, the device 800 may include one or more of the following components: a processing component 802, a memory 804, a power component 806, a multimedia component 808, an audio component 810, an Input/Output (I/O) interface 812, a sensor component 814, and a communication component 816.

The processing component 802 typically controls overall operations of the device 800, such as the operations associated with display, telephone calls, data communications, camera operations, and recording operations. The processing component 802 may include one or more processors 820 for executing instructions to complete all or part of the steps in the described methods. In addition, the processing component 802 may include one or more modules to facilitate interaction between the processing component 802 and other components. For example, the processing component 802 may include a multimedia module to facilitate the interaction between the multimedia component 808 and the processing component 802.

The memory 804 is configured to store various types of data to support operations at the device 800. Examples of such data include instructions for any applications or methods operated on the device 800, contact data, phonebook data, messages, pictures, videos, etc. The memory 804 may be implemented using any type of volatile or non-volatile memory devices, or a combination thereof, such as a Static Random Access Memory (SRAM), an Electrically Erasable Programmable Read-Only Memory (EEPROM), an Erasable Programmable Read-Only Memory (EPROM), a Programmable Read-Only Memory (PROM), a Read-Only Memory (ROM), a magnetic memory, a flash memory, a magnetic disk or an optical disk.

The power component 806 provides power to various components of the device 800. The power component 806 may include a power management system, one or more power sources, and any other components associated with the generation, management, and distribution of power for the device 800.

The multimedia component 808 includes a screen providing an output interface between the device 800 and a user. In some examples, the screen may include a Liquid Crystal Display (LCD) and a Touch Panel (TP). If the screen includes the TP, the screen may be implemented as a touch screen to receive input signals from the user. The TP includes one or more touch sensors to sense touches, swipes and gestures on the TP. The touch sensors may not only sense a boundary of a touch or swipe action but also detect a duration and pressure associated with the touch or swipe action. In some examples, the multimedia component 808 includes a front camera and/or a rear camera. The front camera and/or the rear camera may receive external multimedia data when the device 800 is in an operation mode, such as a shooting mode or a video mode. Each of the front camera and the rear camera may be a fixed optical lens system or may have a focal length and optical zoom capability.

The audio component 810 is configured to output and/or input audio signals. For example, the audio component 810 includes a microphone (MIC) configured to receive external audio signals when the device 800 is in an operation mode, such as a call mode, a recording mode, and a voice recognition mode. The received audio signal may be further stored in the memory 804 or transmitted via the communication component 816. In some examples, the audio component 810 further includes a speaker for outputting audio signals.

The I/O interface 812 provides an interface between the processing component 802 and peripheral interface modules, such as a keyboard, a click wheel, or buttons. The buttons may include, but are not limited to, a home button, a volume button, a start button, and a lock button.

The sensor component 814 includes one or more sensors to provide status assessments of various aspects of the device 800. For instance, the sensor component 814 may detect an open/closed status of the device 800, relative positioning of components, e.g., the display and the keypad, of the device 800, a change in position of the device 800 or a component of the device 800, presence or absence of user contact with the device 800, an orientation or an acceleration/deceleration of the device 800, and a change in temperature of the device 800. The sensor component 814 may include a proximity sensor configured to detect presence of an object nearby without any physical contact. The sensor component 814 may further include a light sensor, such as a Complementary Metal Oxide Semiconductor (CMOS) or Charge Coupled Device (CCD) image sensor, for use in imaging applications. In some examples, the sensor component 814 may further include an accelerometer sensor, a gyroscope sensor, a magnetic sensor, a pressure sensor, or a temperature sensor.

The communication component 816 is configured to facilitate wired or wireless communication between the device 800 and other devices. The device 800 may access a wireless network based on a communication standard, such as WiFi, 2G, or 3G, or a combination thereof. In an example, the communication component 816 receives a broadcast signal or broadcast associated information from an external broadcast management system via a broadcast channel. In an example, the communication component 816 further includes a Near Field Communication (NFC) module to facilitate short-range communications. For example, the NFC module may be implemented based on a Radio Frequency Identification (RFID) technology, an Infrared Data Association (IrDA) technology, an Ultra-wideband (UWB) technology, a Bluetooth (BT) technology, and other technologies.

In an example, the device 800 may be implemented with one or more Application Specific Integrated Circuits (ASICs), Digital Signal Processors (DSPs), Digital Signal Processing Devices (DSPDs), Programmable Logic Devices (PLDs), Field Programmable Gate Arrays (FPGAs), controllers, micro-controllers, micro-processors, or other electronic components, for executing the above method.

In an example, there is also provided a non-transitory computer-readable storage medium including instructions, such as a memory 804 including instructions executable by the processor 820 of the device 800, for executing the above method. For example, the non-transitory computer-readable storage medium may be a Read-Only Memory (ROM), a Random Access Memory (RAM), a Compact Disc Read-Only Memory (CD-ROM), a magnetic tape, a floppy disc, an optical data storage device, and the like.

For a non-transitory computer-readable storage medium, when instructions in the storage medium are executed by the processor of the first terminal, the first terminal may execute the method for information processing. The method includes:

based on the connection with the second terminal, a notification message sent by the second terminal is acquired, wherein the notification message is generated by the second terminal after a first operation is detected by the second terminal; and the responding result for the first operation is output based on the first terminal according to the notification message.

For a non-transitory computer-readable storage medium, when instructions in the storage medium are executed by the processor of the second terminal, the second terminal may execute the method for information processing. The method includes:

a notification message is generated based on the detected first operation; and the notification message is sent to a first terminal so that the first terminal outputs a responding result for the first operation according to the notification message.

The technical solution provided by the examples of the disclosure may include the beneficial effects as follows.

In the examples of the disclosure, after the connection between the first terminal and the second terminal is established, the first terminal may receive the notification message sent by the second terminal, and the responding result for the first operation may be output based on the first terminal according to the notification message. In this way, on the one hand, the relay of the first operation on the second terminal may be realized based on the first terminal, that is, the subsequent steps of the first operation performed on the second terminal may be executed on the first terminal, and under the condition that a user is inconvenient to use or does not want to continue to use the second terminal, the user may continue to use the first terminal for subsequent operations, thereby improving the experience of the user using a terminal device. On the other hand, in the disclosure, the relay of the first operation may be realized only by establishing a connection between the first terminal and the second terminal, and there is no need for the user to log in the unified account on the first terminal and the second terminal respectively and then perform data sharing and operation relay, so that the operation steps of the user may be reduced to improve the convenience of the operation.

The present disclosure may include dedicated hardware implementations such as application specific integrated circuits, programmable logic arrays and other hardware devices. The hardware implementations can be constructed to implement one or more of the methods described herein. Examples that may include the apparatus and systems of various implementations can broadly include a variety of electronic and computing systems. One or more examples described herein may implement functions using two or more specific interconnected hardware modules or devices with related control and data signals that can be communicated between and through the modules, or as portions of an application-specific integrated circuit. Accordingly, the system disclosed may encompass software, firmware, and hardware implementations. The terms "module," "sub-module," "circuit," "sub-circuit," "circuitry," "sub-circuitry," "unit," or "sub-unit" may include memory (shared, dedicated, or group) that stores code or instructions that can be executed by one or more processors. The module refers herein may include one or more circuit with or without stored code or instructions. The module or circuit may include one or more components that are connected.

After considering the specification and implementing the disclosure disclosed here, other implementation solutions of the disclosure would readily be conceivable to a person skilled in the art. The disclosure is intended to cover any variations, uses, or adaptations of the disclosure following the general principles thereof and including such departures from the disclosure as come within known or customary practice in the art. It is intended that the specification and examples be considered as exemplary only.

It is to be understood that the disclosure is not limited to the exact construction that has been described above and illustrated in the accompanying drawings, and that various modifications and changes can be made without departing from the scope thereof.

What is claimed is:

1. A method for information processing, applied to a first terminal, comprising:

connecting a second terminal, and acquiring a notification message sent by the second terminal, wherein the notification message is generated by the second terminal after a first operation is detected by the second terminal;

displaying the notification message at a set position on a current interface of the first terminal; and outputting, by the first terminal, a responding result for the first operation according to the notification message;

wherein outputting, by the first terminal, the responding result for the first operation according to the notification message comprises:

outputting the responding result based on a detected trigger operation for the set position, and wherein the notification message floats and is displayed at the set position in a form of a notification box; and wherein outputting, by the first terminal, the responding result for the first operation according to the notification message further comprises:

determining a first application, to which the first operation is applied, on the second terminal according to the notification message;

acquiring identification information of the first application from the notification message;

comparing the identification information of the first application with identification information of each application on the first terminal to obtain a comparison result; and determining whether the first terminal has a second application associated with the first application according to the comparison result;

responsive to that the first terminal has the second application associated with the first application, wherein the second application on the first terminal is different from the first application on the second terminal, outputting the responding result through the second application.

2. The method of claim 1, wherein the outputting, by the first terminal, the responding result for the first operation according to the notification message comprises:

acquiring the responding result generated based on the first operation from the notification message; and outputting, by the first terminal, the responding result based on the first terminal.

3. The method of claim 2, wherein:

the first operation comprises a copying operation; and acquiring the responding result generated based on the first operation from the notification message comprises:

acquiring content information from the notification message, wherein the content information is content information selected based on the copying operation; and outputting, by the first terminal, the responding result comprises:

outputting the content information based on a pasting operation detected by the first terminal, and wherein the content information comprises at least one of text content or picture content.

4. The method of claim 2, wherein:

the first operation comprises a shooting operation; and acquiring the responding result generated based on the first operation from the notification message comprises:

acquiring an image shot based on the shooting operation from the notification message; and outputting, by the first terminal, the responding result comprises:

outputting, by the first terminal, an image.

5. The method of claim 2, wherein:

the first operation comprises a document browsing operation; and acquiring the responding result generated based on the first operation from the notification message comprises:

acquiring document content targeted by the document browsing operation from the notification message; and outputting, by the first terminal, the responding result comprises:

outputting, by the first terminal, the document content.

6. The method of claim 2, wherein:

the first operation comprises a web page browsing operation; and acquiring the responding result generated based on the first operation from the notification message comprises:

acquiring web page content targeted by the web page browsing operation from the notification message; and outputting, by the first terminal, the responding result comprises:

outputting, by the first terminal, the web page content.

7. The method of claim 1, wherein the method further comprises:

responsive to that the first terminal does not have the second application associated with the first application, outputting prompting information in a current interface of the first terminal to prompt a user to download and install the second application.

8. A non-transitory computer-readable storage medium having stored thereon instructions that, when executed by a processor of a device for information processing, cause the device to perform the method of claim 1.

9. A method for information processing, applied to a second terminal, comprising:

generating a notification message based on a detected first operation; and sending the notification message to a first terminal so that the first terminal outputs a responding result for the detected first operation according to the notification message;

wherein the notification message is configured to instruct the first terminal to perform following operations:

displaying the notification message at a set position on a current interface of the first terminal; and outputting the responding result for the detected first operation according to the notification message;

wherein outputting the responding result for the detected first operation according to the notification message comprises:

outputting the responding result based on a detected trigger operation for the set position, and wherein the notification message floats and is displayed at the set position in a form of a notification box; and wherein outputting the responding result for the detected first operation according to the notification message further comprises:

determining a first application, to which the detected first operation is applied, on the second terminal according to the notification message;

acquiring identification information of the first application from the notification message;

comparing the identification information of the first application with identification information of each application on the first terminal to obtain a comparison result; and determining whether the first terminal has a second application associated with the first application according to the comparison result;

responsive to that the first terminal has the second application associated with the first application, wherein the second application on the first terminal is different from the first application on the second terminal, outputting the responding result through the second application.

10. The method of claim 9, wherein generating the notification message based on the detected first operation comprises:

when the detected first operation is applied to the first application located on the second terminal, generating the notification message based on program parameters of the first application, and wherein the program parameters are used by the first terminal to determine that there is a second application associated with the first application.

11. The method of claim 9, wherein generating the notification message based on the detected first operation comprises:

acquiring the notification message based on the responding result generated by the detected first operation.

12. The method of claim 9, wherein the detected first operation comprises at least one of:

a copying operation;

a shooting operation;

a document browsing operation; or a web page browsing operation.

13. The method of claim 9, wherein the notification message is further configured to instruct the first terminal to perform following operation:

responsive to that the first terminal does not have the second application associated with the first application, outputting prompting information in a current interface of the first terminal to prompt a user to download and install the second application.

14. A device for information processing, the device comprising:

a processor; and a memory configured to store instructions executable by the processor, wherein the processor is configured to execute the instructions to perform the method for information processing of claim 9.

15. A device for information processing, applied to a first terminal, comprising:

a processor;

a memory configured to store instructions executable by the processor, wherein the processor is configured to execute the instructions to:

connect the first terminal with a second terminal and acquire a notification message sent by the second terminal, wherein the notification message is generated by the second terminal after a first operation is detected by the second terminal; and output a responding result for the first operation according to the notification message; and a display, configured to display the notification message at a set position on a current interface of the first terminal;

wherein the processor is further configured to output the responding result based on a detected trigger operation for the set position, the notification message floats and is displayed at the set position in a form of a notification box; and wherein the processor is further configured to execute the instructions to:

determine a first application, to which the first operation is applied, on the second terminal according to the notification message;

acquire identification information of the first application from the notification message;

compare the identification information of the first application with identification information of each application on the first terminal to obtain a comparison result; and determine whether the first terminal has a second application associated with the first application according to the comparison result;

responsive to that the first terminal has the second application associated with the first application, wherein the second application on the first terminal is different from the first application on the second terminal, output the responding result through the second application.

16. The device of claim 15, wherein the processor is further configured to execute the instructions to:

acquire the responding result generated based on the first operation from the notification message; and output the responding result.

17. The device of claim 16, wherein:

the first operation comprises a copying operation; and the processor is further configured to execute the instructions to:

acquire content information from the notification message, wherein the content information is content information selected based on the copying operation; and output the content information based on a pasting operation detected by the first terminal, and wherein the content information comprises at least one of text content or picture content.

18. The device of claim 16, wherein:

the first operation comprises a shooting operation; and the processor is further configured to execute the instructions to: acquire an image shot based on the shooting operation from the notification message; and output an image, or the first operation comprises a document browsing operation; and the processor is further configured to execute the instructions to: acquire document content targeted by the document browsing operation from the notification message; and output the document content, or the first operation comprises a web page browsing operation; and the processor is further configured to execute the instructions to: acquire web page content targeted by the web page browsing operation from the notification message; and output the web page content.

19. The device of claim 15, wherein the processor is further configured to execute the instructions to:

responsive to that the first terminal does not have the second application associated with the first application, output prompting information in a current interface of the first terminal to prompt a user to download and install the second application.

* * * * *